US012405031B2

(12) United States Patent
Porwal et al.

(10) Patent No.: US 12,405,031 B2
(45) Date of Patent: Sep. 2, 2025

(54) PREDICTING REMAINING USEFUL LIFE OF A WATER HEATER STORAGE TANK

(71) Applicant: Rheem Manufacturing Company, Atlanta, GA (US)

(72) Inventors: Piyush Porwal, Montgomery, AL (US); Atilhan Manay, Marietta, GA (US); Ankur Maheshwari, Atlanta, GA (US)

(73) Assignee: Rheem Manufacturing Company, Atlanta, GA (US)

( * ) Notice: Subject to any disclaimer, the term of this patent is extended or adjusted under 35 U.S.C. 154(b) by 1122 days.

(21) Appl. No.: 17/000,558

(22) Filed: Aug. 24, 2020

(65) Prior Publication Data

US 2022/0057111 A1 Feb. 24, 2022

(51) Int. Cl.
*F24H 9/20* (2022.01)
*F24H 9/45* (2022.01)
*G08B 21/18* (2006.01)

(52) U.S. Cl.
CPC ............. *F24H 9/2021* (2013.01); *F24H 9/45* (2022.01); *G08B 21/187* (2013.01)

(58) Field of Classification Search
None
See application file for complete search history.

(56) References Cited

U.S. PATENT DOCUMENTS 4,407,711 A * 10/1983 Baboian .................. C23F 13/04 204/196.02
2014/0218005 A1* 8/2014 Farris ..................... G01N 17/02 324/71.2
2014/0218006 A1* 8/2014 Gross ..................... G01N 17/02 324/71.4
2017/0193794 A1* 7/2017 Farris ........................ F24H 9/45
(Continued)

FOREIGN PATENT DOCUMENTS

JP 2003148811 A 5/2003
WO 2007/010335 A2 1/2007
WO WO-2014136097 A1 * 9/2014 ............. C23F 13/04

OTHER PUBLICATIONS

GC-Compass: A software tool for galvanic corrosion prediction and materials compatibility, Version 9.18, published Apr. 23, 2019, WebCorr corrosion consulting services.

(Continued)

*Primary Examiner* — Thor S Campbell
(74) *Attorney, Agent, or Firm* — Eversheds Sutherland (US) LLP

(57) ABSTRACT

The present disclosure addresses systems, media, and methods of predicting a remaining useful life of a water heater storage tank included in a water heating system. To predict the remaining useful life of the water heater storage tank, algorithmic calibration processes can be used to determine an anodic current range for a corrosive current flowing between the water heater storage tank and an anode rod inserted into the water heater storage tank. Respective values (Continued)

for the corrosive current can be measured, and a rate of reduction of the corrosive current can be calculated based on the respective measured values for the corrosive current. An estimate of a remaining useful life of the water heater storage tank can be made, and an alert indicative thereof can be transmitted based, at least in part, on the calculated rate of reduction of the corrosive current.

20 Claims, 4 Drawing Sheets

(56) References Cited

U.S. PATENT DOCUMENTS

| | | | | |
|---|---|---|---|---|
| 2019/0170396 | A1 | 6/2019 | Azulay et al. | |
| 2019/0203977 | A1 | 7/2019 | Arensmeier | |
| 2020/0191851 | A1 | 6/2020 | Essawy et al. | |
| 2020/0348049 | A1* | 11/2020 | Knoeppel | F24H 1/203 |
| 2021/0340679 | A1* | 11/2021 | Glass | G01N 17/02 |
| 2022/0057111 | A1* | 2/2022 | Porwal | G08B 21/182 |

OTHER PUBLICATIONS

International Search Report and Written Opinion for PCT Application No. PCT/US2021/046639 mailed Nov. 11, 2021.

* cited by examiner

PREDICTING REMAINING USEFUL LIFE OF A WATER HEATER STORAGE TANK

BACKGROUND

Modern water heating systems typically include metallic storage tanks (e.g., steel) with an internal glass lining. The glass lining helps protect the steel tank from the corrosion that will inevitably occur with continuous exposure to water and varying service temperatures. Over time, if too much corrosion occurs, the tank will begin to leak. Often, a metallic rod (or an anode rod) is inserted into the tank to provide additional protection against corrosion. Inserting anode rods into water heater storage tanks has been shown to slow the corrosion process, extending the lifespan of the tank by as much as several years.

Currently, water heater user and care manuals instruct the consumer to remove the anode rod from the tank for inspection every two years, and to replace the anode rod if the rod has depleted to a specified degree. Unless the consumer is sufficiently equipped to remove the anode rod from the tank themselves and/or sufficiently knowledgeable to tell when the rod has been functionally depleted, an inspection performed by a licensed professional may be needed to determine the condition of the tank.

Whether performed by the owner or a professional, the water must be turned off and the tank partially drained to remove the rod for inspection. Removing/re-inserting the rod after inspection may be difficult depending on how much the rod has rusted. To further complicate things, it is likely there will be inadequate overhead clearance to fully remove the rod from the tank. Given these inconveniences and difficulties, consumers frequently fail to have the water storage tanks of their water heating systems inspected which in turn leads to a catastrophic failure of the storage tank (e.g., leaks and resulting water damage).

Thus, improvements for predicting remaining useful life of water heater storage tanks are desired.

SUMMARY

According to the disclosed technology, a method of predicting a remaining useful life of a metallic water heater storage tank is disclosed. The method can include determining, using an algorithmic calibration process, an anodic current range for a corrosive current flowing between the water heater storage tank and an anode rod inserted into the water heater storage tank. The method can include measuring, periodically, respective values for the corrosive current and calculating a rate of reduction of the corrosive current based on respective measured values for the corrosive current. The method can include estimating, based on the calculated rate of reduction of the corrosive current, a remaining useful life of the water heater storage tank. The method can include transmitting an alert indicative of the remaining useful life of the water heater storage tank based, at least in part, on the calculated rate of reduction of the corrosive current.

According to the disclosed technology, the calibration process used in determining the anodic current range can include measuring intrinsic characteristics of water stored in the water heater storage tank, where the intrinsic characteristics measured include water hardness and pH. The calibration process can include estimating, based on the measured intrinsic characteristics, a baseline corrosive current. The baseline corrosive current can define an upper limit of the anodic current range. The calibration process can include estimating, responsive to the baseline corrosive current being estimated and based on the measured intrinsic characteristics, a critical corrosive current. The critical corrosive current can define a lower limit of the anodic current range.

According to the disclosed technology, estimating the remaining useful life of the water heater storage tank further can include establishing a threshold value between the baseline corrosive current and the critical corrosive current, below which the alert indicative of the remaining useful life of the water heater storage tank is transmitted. Estimating the baseline corrosive current, the critical corrosive current, and the remaining useful life of the water heater storage tank can use at least one of: a regression analysis technique, a distributive algorithm, and/or a machine learned algorithm.

The baseline corrosive current, the critical corrosive current, and the respective measured corrosive currents can be galvanic currents. The anode rod inserted into the water heater storage tank can be or include a sacrificial anode rod comprising a magnesium alloy or an aluminum alloy. The alert indicative of the remaining useful life of the water heater storage tank can be configured for transmission to at least one of a computing device, a mobile computing device, or a combination thereof According to the disclosed technology, a non-transitory computer-readable storage medium can have computer-executable instructions stored thereon, execution of which, by one or more processing devices, can cause the one or more processing devices to perform operations for predicting the remaining useful life of a water heater storage tank according to various embodiments outlined above and below.

According to the disclosed technology, a water heating system can include a water heater storage tank, an anode rod inserted into the water heater storage tank, and corrosion prediction circuitry in electrical communication with the water heater storage tank and the anode rod. The corrosion prediction circuitry can predict the remaining useful life of the water heater storage tank according to various embodiments outlined above and below.

DETAILED DESCRIPTION

Figure 1:
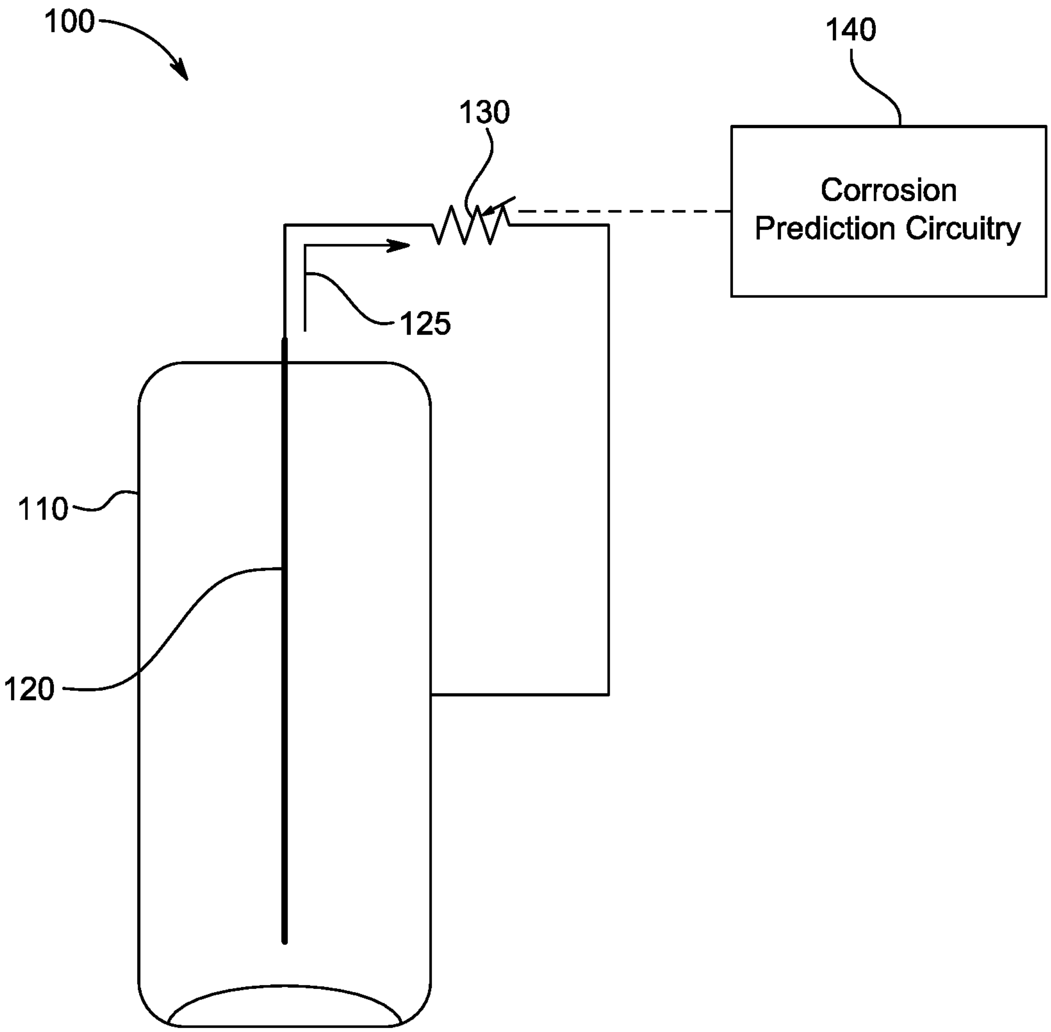
FIG. 1 depicts a water heating system, in accordance with the present disclosure.

Providing a prognostic approach for predicting the remaining useful life of a water heater storage tank of a water heating system would be advantageous for many reasons. Proactively monitoring remaining useful life of the water heater storage tank affords a consumer the opportunity to plan inspections of the water heater tank. Doing so also allows the owner to shop for plumbers/parts in advance, as opposed to reactively as is the current norm. Additionally, if needed, owners can schedule replacement of the water heater storage tank well before any failure(s) of the tank itself, saving any water damage and/or flooding that may result from the failure.

The present disclosure relates to systems, media, and methods for predicting a remaining useful life of a water heater storage tank. The remaining useful life of a water heater storage tank, as used herein, shall refer to an algorithmically determined estimate of the overall expected durability of the respective water heater storage tank upon which a recommendation(s) is based. For instance, the recommendation can be a maintenance schedule for the water heater storage tank. As a water heater storage tank ages and its overall durability declines, the estimate of remaining useful life of the tank is reduced.

As the water hardness and pH conditions vary largely based on the supply water conditions where the water heater is installed, an adaptive calibration process is used to determine the baseline corrosive current range. Based on a calibration process which may take into account multiple variables, an estimate of the overall life expectancy (e.g., useful life) of a water heater storage tank can be made. Those variables may include (but are not limited to) intrinsic characteristics of the water that will be stored in the tank, the amount of water that will be flowing through the tank, the composition of the tank, and the composition of the anode rod that will be inserted into the tank.

As previously mentioned, water heater storage tanks included in modern water heating systems are typically steel with an internal glass lining, with the glass lining intended to help prevent the corrosion caused by water being stored in the tank. To further protect from corrosion, a rod of a dissimilar metal can be inserted into the water heater storage tank. When an environment contains an electrolyte (e.g., the water stored in the water heater storage tank) and two dissimilar metals (the steel water heater storage tank and a rod of, for instance, a magnesium alloy inserted into the water heater storage tank), a current begins to flow between the metals. In this case the current, commonly referred to as a galvanic current, is flowing unidirectionally between the rod, which is acting as an anode, and the water heater storage tank, which is acting as a cathode (or ground). If a load (e.g., an impedance) were to be placed across the anode rod and the water heater storage tank, it would be possible to electronically and/or communicatively couple electronic devices to the water heating system.

When a galvanic current flows between the anode rod and the water heater storage tank, ions from the anode rod are sacrificed; as ions are sacrificed from the anode rod, the anode rod is depleted (e.g., shrinks/corrodes); and as the anode rod is depleted, the galvanic current flowing between the anode rod and the water heater storage tank is reduced. Determining a rate of reduction of the galvanic current over time enables the estimating of a remaining useful life of the water heater storage tank.

As an example, a three-tiered recommendation system can be implemented. A water heater storage tank is expected to have 100 percent of its estimated 10-year useful life remaining upon installation. Thus, the water heater storage tank will appear as being in a "green zone", indicating an estimated 100 percent to 60 percent (e.g., 10 years to six years) of its estimated useful life remaining and only occasional inspection. Depending on the variables measured during the calibration process or other manufacturer considerations, the water heater storage tank may leave the green zone when, for instance, 75 percent, 70 percent, or 50 percent of its useful life is estimated to be remaining. Based on estimated remaining useful life in the green zone, it may be recommended that the tank be inspected every two years.

Once the estimated remaining useful life of the water heater storage tank falls to 59 percent, the tank may appear in a "yellow zone", or period of increased precaution. Continuing with this example, the water heater storage tank remains in the yellow zone until the estimated remaining useful life falls to 20 percent of the originally estimated life expectancy established through the calibration process. In other words, a water heater storage tank having a 10-year expected life may appear in the yellow zone when the estimated remaining useful life is more than two years, but less than six years. Depending on the variables accounted for during the calibration process, the water heater storage tank may appear as being in the yellow zone when, for instance, when the remaining useful life of the respective water heater storage tank is estimated to be less than seven years, but more than one and a half years. Responsive to the respective water heater storage tank, or any water heater storage tank for that matter entering the yellow zone, it may be recommended that tank be inspected every year.

Responsive to the above-described water heater storage tank having a 10-year life expectancy falling below 20 percent, indicating it is estimated the tank has less than two years of useful life remaining, the tank is considered to have entered "the red zone". Depending on the variables accounted for during the calibration process, the water heater storage tank may appear as being in the red zone when, for instance, the remaining useful life of the respective water heater storage tank is estimated to be less than three years. Recommendations for the respective tank in the red zone, or any tank in the red zone, may change from annual or semi-annual maintenance to a complete replacement. Changing the recommendations from regular inspection/maintenance to replacement responsive to the estimated remaining useful life of the water heater storage tank entering the red zone is done to maximize the amount of time a consumer has to, for example, schedule a final inspection, start price shopping for a replacement water heater storage tank, start price shopping for a licensed professional to perform the replacement, etc.

While the calibration process and various other factors considered in predicting the overall life expectancy of a water heater storage tank are fairly reliable, the estimates as to the remaining useful life are just that—estimates—and are by no means intended to be taken as absolute. As the remaining useful life of a water heater storage tank declines over time, the estimate(s) are used to recommend a course of action (e.g., a maintenance schedule) to a consumer. It is then left entirely to the consumer to decide what to do with the recommendations.

Descriptions are given with reference to the figures included herein. When possible and for clarity, reference numbers are kept consistent from figure to figure. Some of the figures are simplified diagrams, which are not to be interpreted as drawn to scale or spatially limiting for the described embodiments. Where appropriate, the particular perspective or orientation of a figure will be given to increase understanding of the depicted features, but alternative orientations or arrangements can be possible within the scope of the present application.

FIG. 1 depicts water heating system 100, in accordance with the present disclosure. Included in water heating system 100 is water heater storage tank 110, anode rod 120 which inserted into water heater storage tank 110, impedance 130, and corrosion prediction circuitry 140. Anode rod 120 can be a sacrificial anode rod of, for instance, magnesium, aluminum, a magnesium alloy, or an aluminum alloy.

A corrosive current 125, which is a galvanic current, is shown flowing unidirectionally from anode rod 120, across impedance 130, and into water heater storage tank 110. As depicted in FIG. 1, water heater storage tank 110 is acting as a cathode (or ground), placing the corrosion prediction circuitry 140 in electrical communication with the water heating system 100. Impedance 130 can be a resistance, a capacitance, an inductance, or a combination thereof Corrosion prediction circuitry 140 determines, algorithmically, an anodic current range for corrosive current 125 flowing in water heating system 100. The anodic current range can be determined via a calibration process. The calibration process can include measuring intrinsic characteristics, such as hardness, pH, salinity, alkalinity, etc., of water stored in water heater storage tank 110. These intrinsic characteristics can be measured over an extended period of time (e.g., three days, seven days, two weeks, one month). Based on the values of the intrinsic characteristics of the water stored in water heater storage tank 110 measured over the extended period of time, a baseline corrosive current, defining an upper limit of the anodic current range, is estimated.

As a non-limiting example, a moving average of the values corresponding to the intrinsic characteristics (e.g., hardness and/or pH) of the water stored in water heater storage tank 110 measured over the seven-day calibration process can be used to estimate the baseline corrosive current. Responsive to the baseline corrosive current being estimated and based on the measured intrinsic characteristics of the water stored in water heater storage tank 110, a critical corrosive current defining a lower limit of the anodic current range is estimated.

Corrosion prediction circuitry 140 can also be configured to measure, periodically, respective values (e.g., magnitude) of the corrosive current 125, and to calculate a rate of reduction of the corrosive current based on the respective measured values for the corrosive current 125. It is to be understood that the rate of reduction of the corrosive current is indicative of the decline in the respective values (e.g., magnitude) of the corrosive current 125 over time. Responsive to the respective values of the corrosive current 125 being measured, and based on the calculated rate of reduction of the corrosive current 125, an estimate of a remaining useful life of water heater storage tank 110 is made.

The corrosion prediction circuitry 140 can be configured to transmit an alert indicative of the remaining useful life of the water heater storage tank, based at least in part, on the calculated rate of reduction of the corrosive current. Additionally and/or alternatively, the corrosion prediction circuitry 140 can be configured to establish a threshold value between the baseline corrosive current and the critical corrosive current, inclusive of each limit, below which the alert indicative of the remaining useful life of the water heater storage tank is transmitted.

The baseline corrosive current, the critical corrosive current, the threshold value, and the remaining useful life of the water heater storage tank can be estimated using at least one of a regression analysis technique, a distributive algorithm, and/or a machine learned algorithm. Alternatively, water hardness and pH sensors can be directly incorporated to create correlation curves as a party of any regression curve analysis or machine learning algorithms. Further, the alert indicative of the remaining useful life of the water heater storage tank is configured for transmission to one or more computing devices and/or mobile computing devices.

Optionally, and now shown in FIG. 1, additional sensors can be added to the system for calibration and measurement purposes. For example, water hardness and/or pH sensors can be part of the water heating system 100 to be used during the calibration phase of measurement. The use of optional sensors can, in turn, use an optional data bridge to relay sensed data to one or more computing devices to carry out the calibration process. Such a data bridge can be wired or wireless, as will be understood by one of skill in the relevant arts.

Figure 2:
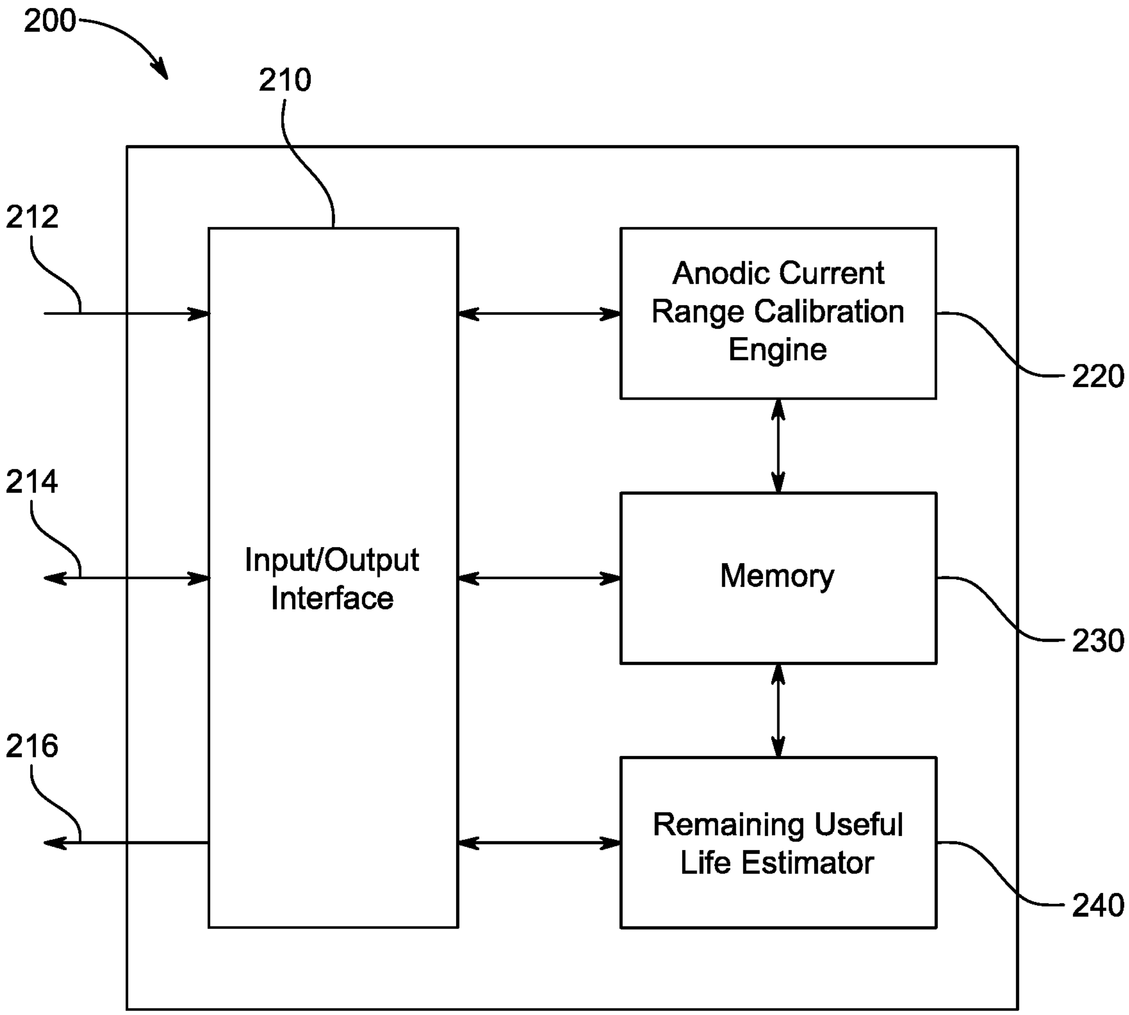
FIG. 2 illustrates corrosion prediction circuitry, in accordance with the present disclosure.

FIG. 2 is a block diagram illustrating corrosion prediction circuitry 200, which can be substantially similar and/or identical to corrosion prediction circuitry 140 of FIG. 1. Included in corrosion prediction circuitry 200 is an input/output (I/O) interface 210, an anodic current range calibration (ACRC) engine 220, a memory 230, and a remaining useful life (RUL) estimator 240. I/O interface 210 is shown communicating (e.g., transmitting and receiving data to/from) with components/devices external (e.g., electronically/communicatively coupled) to corrosion prediction circuitry 200 via input 212, communication pathway 214 (which is both input and output), and output 216 (which may be collectively referred to as communication pathways 212, 214, 216). Memory 230 is also shown transmitting/receiving data to/from ACRC engine 220 and RUL estimator 240.

In some examples, communications with the external components/devices via communication pathways 212, 214, and 216 can be enabled via any number of communications protocols. The enabling communications protocols can include, but are not limited to, Bluetooth, WiFi, 2G/3G/4G/LTE/5G, ZigBee, NFC, RFID, USB, VGA, HDMI, DVI, S-Video, Display Port, Thunderbolt, and all variants thereof.

At input 212, I/O interface 210 is shown receiving data from components/devices external to corrosion prediction circuitry 200. Examples of external components/devices from which corrosion prediction circuitry 200 can receive data via input 212 include, but are not limited to sensors/sensing devices and arrays thereof. For instance, values corresponding to a current flowing in a water heater storage tank, as measured by a current sensor communicatively coupled to corrosion prediction circuitry 200, can be received via input 212. In other examples, data corresponding to the mineral content (e.g., the hardness/salinity/alkalinity), temperature, and/or pH of water included in a water heater storage tank can be received by corrosion prediction circuitry 200 via input 212. Once collected, the data received via input 212 can be transmitted, through I/O interface 210, to ACRC engine 220, memory 230, and/or RUL estimator 240.

At communication pathway 214, I/O interface 210 is shown as being in two-way communication (e.g., transmitting/receiving data to/from) with components/devices external to corrosion prediction circuitry 200. Examples of external components/devices with which corrosion prediction circuitry 200 may communicate via communication pathway 214 include, but are not limited to, a keyboard, a mouse, a display device, a touch-sensitive display device, a trackpad, a signature pad, and/or a combination thereof. Additionally and/or alternatively, via communication pathway 214, corrosion prediction circuitry 200 can communicate with personal/mobile computing devices, examples of which can include, but are not limited to, a desktop computer, a laptop, a mobile phone/handset, a tablet, a personal digital assistant, and/or a combination thereof.

As will be appreciated, a user can use a keyboard to manually input data corresponding to aspects of a water heating system (e.g., values corresponding to a current flowing in a water heater storage tank and/or values corresponding to pH of the water stored therein) via communication pathway 214. Data received via communication pathway 214 passes through I/O interface 210 before being transmitted to ACRC engine 220, memory 230, and/or RUL estimator 240.

Alternatively or additionally, an alert indicative of the durability of a water heating system (e.g., an estimate of a remaining useful life of a water heater storage tank included in the water heating system) can be transmitted, via communication pathway 214, to a personal/mobile computing device of a user. Data output by ACRC engine 220, memory 230, and/or RUL estimator 240 passes through I/O interface 210 before being transmitted to the personal/mobile computing device of the user.

ACRC engine 220 is circuitry for determining an anodic current range for a corrosive current flowing in, for instance, a water heater storage tank to which it is electronically coupled. Included in ACRC engine 220 is one or more processors and one or more non-transitory memory devices. The processors can be used for executing instructions stored in the memory devices, and the memory devices can be used for storing data/values received through I/O interface 210 from components/devices external to corrosion prediction circuitry via communication pathways 212, 214, and/or retrieved from memory 230. The results of the calibration process executed by ACRC engine 220 are shown as being stored in memory 230 before being transmitted to RUL estimator 240. Although not depicted in FIG. 2, the results of the calibration process can be transmitted directly from ACRC engine 220 to RUL estimator 240.

RUL estimator 240 is circuitry for estimating a remaining useful life of a water heater storage tank included in a water heater storage system to which it is electronically coupled. Included in RUL estimator 240 is one or more processors and one or more non-transitory memory devices. The processors can be used for executing instructions stored in the memory devices, and the integrated memory devices can be used for storing data/values received through I/O interface 210 from components/devices external to corrosion prediction circuitry via communication pathways 212, 214, and/or retrieved from memory 230.

Responsive to receiving the results of the calibration process executed by ACRC engine 220, RUL estimator 240 calculates a rate of reduction of the corrosive current flowing in the water heater storage tank. Responsive to calculating the rate of reduction of the corrosive current, RUL estimator 240 estimates a remaining useful life of the water heater storage tank. RUL estimator 240 transmits an alert indicative of the estimated remaining useful life through I/O interface 210 to components/devices external to corrosion prediction circuitry 200 via communication pathways 214 and/or 216.

Memory 230 is a non-transitory memory (e.g., RAM, ROM, a hard/solid-state disc, etc.) or an array thereof that can store values received via communication pathways 212 and/or 214. These stored values can be used by ACRC engine 220 to perform an algorithmic calibration process, and/or by RUL estimator 240 in calculating the rate of change of the anodic current and/or in estimating a remaining useful life. Memory 230 can be the only source of a value(s) which is to be used by ACRC engine 220 in executing an algorithmic calibration process and/or by RUL estimator 240 in calculating the rate of change of anodic current and/or in estimating a remaining useful life. Alternatively or additionally, memory 230 can act as a buffer/a source of redundancy for values used ACRC engine 220 in executing an algorithmic calibration process and/or by RUL estimator 240 in calculating the rate of change of anodic current and/or in estimating a remaining useful life. Alternatively or additionally, memory 230 can be bypassed completely as ACRC engine 220 and/or RUL estimator 240 receive directly from components/devices external to corrosion prediction circuitry 200 the values to be used in executing an algorithmic calibration process, calculating the rate of change of anodic current and/or in estimating a remaining useful life.

In accordance with the present disclosure, corrosion prediction circuitry 200 can include a non-transitory computer-readable storage medium having a set of computer-executable instructions stored thereon, execution of which, by one or more processing devices, causes the one or more processing devices to perform operations for predicting a remaining useful life of a water heater storage tank.

ACRC engine 220 can perform (e.g., via the processor(s) and non-transitory memory device(s) included therein) operations for determining, using an algorithmic calibration process, an anodic current range for a corrosive current flowing between the water heater storage tank and an anode rod inserted into the water heater storage tank. The anode rod inserted into the water heater storage tank can be a sacrificial anode rod comprising magnesium, aluminum, a magnesium alloy, or an aluminum alloy.

The calibration process can include measuring intrinsic characteristics, such as hardness, pH, salinity, alkalinity, etc. of water stored in the water heater storage tank. These intrinsic characteristics can be measured over an extended period of time (e.g., three days, seven days, two weeks, one month) by a sensor or an array thereof electronically coupled to corrosion prediction circuitry 200. Based on the values of the intrinsic characteristics of the water stored in the water heater storage tank measured over the extended period of time, a baseline corrosive current, defining an upper limit of the anodic current range, is estimated.

As a non-limiting example, a moving average of the values corresponding to the intrinsic characteristics (e.g., hardness and/or pH) of the water stored in the water heater storage tank measured over the seven-day calibration process can be used to estimate the baseline corrosive current. Responsive to the baseline corrosive current being estimated and based on the measured intrinsic characteristics of the water stored in the water heater storage tank, a critical corrosive current defining a lower limit of the anodic current range can be estimated.

Further, a current sensor or an array thereof electronically coupled to corrosion prediction circuitry 200 can be used for measuring, periodically, respective values for the corrosive current flowing in the water heater storage tank. Based on the respective measured values for the corrosive current, and responsive to execution of computer-executable instructions stored thereon by one or more processing devices included therein, RUL estimator 240 calculates a rate of reduction of the corrosive current. The respective measured values used in calculating a rate of reduction of the corrosive current can be transmitted to RUL estimator 240 via I/O interface 210 and/or RUL estimator 240 can receive the respective measured values from memory 230.

Responsive to calculating a rate of reduction of the corrosive current, RUL estimator 240 can estimate, based on the calculated rate of reduction, a remaining useful life of the water heater storage tank and can transmit an alert indicative of the remaining useful life of the water heater storage tank based, at least in part, on the calculated rate of reduction of the corrosive current. The alert can be transmitted, through I/O interface 210, via output 216, to components/devices external to corrosion prediction circuitry 200. The alert indicative of the remaining useful life of the water heater storage tank can be configured for transmission to one or more computing devices and/or mobile computing devices.

Estimating the remaining useful life of the water heater storage tank can include establishing a threshold value between the baseline corrosive current and the critical corrosive current, below which the alert indicative of the remaining useful life of the water heater storage tank is transmitted. The threshold value can correspond to the value of the baseline anodic current, the value of the critical anodic current, or a value that is truly in between the baseline and critical anodic current values.

In accordance with the present disclosure, when estimating the threshold value, the baseline corrosive current, the critical corrosive current, and the remaining useful life of the water heater storage tank, at least one of a regression analysis technique, a distributive algorithm, or a machine learned algorithm can be used. Furthermore, the baseline corrosive current, the critical corrosive current, and the respective measured current can be galvanic currents.

Figure 3:
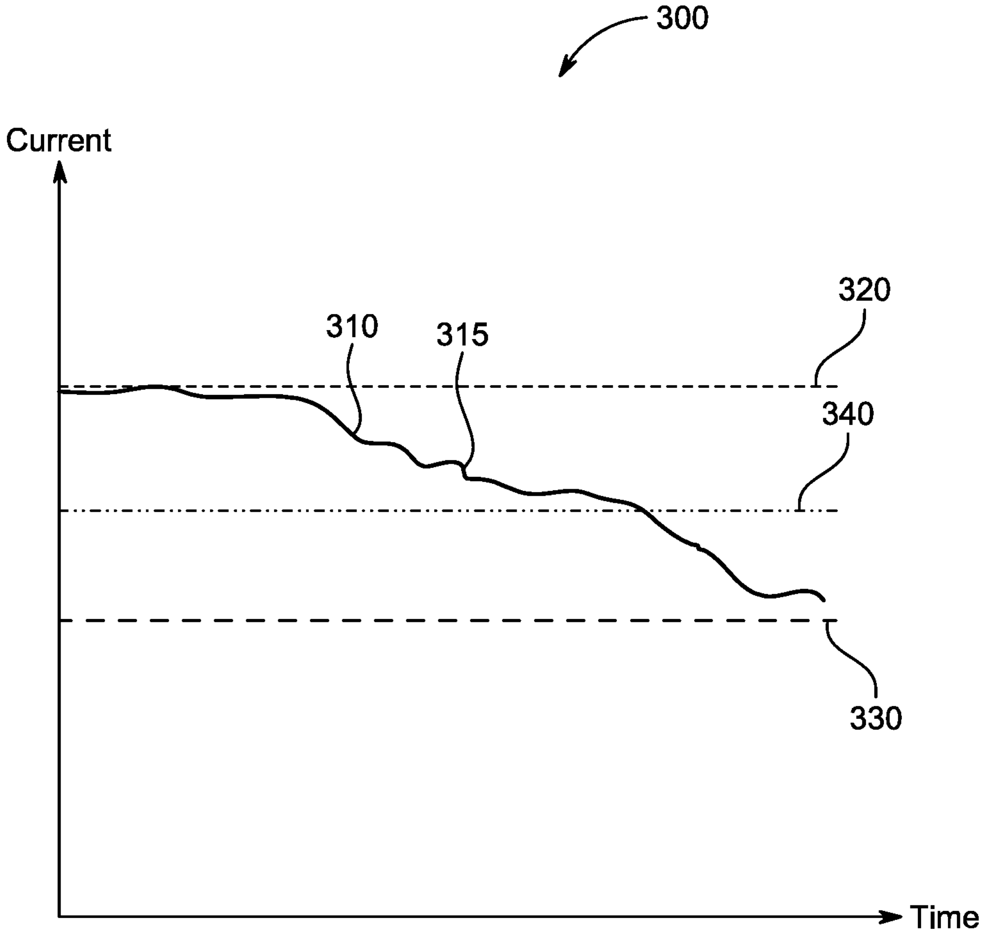
FIG. 3 is a graph of an anodic current range, in accordance with the present disclosure.

FIG. 3 is a graph 300 of an anodic current range corresponding to the anodic current range described in FIG. 1. On its Y-axis is current (I), measured in amperes, the exact prefix of which (e.g., micro-, nano-, etc.) is inconsequential for the present application. On its X-axis is time, the exact unit of which is also inconsequential for the present disclosure, although generally speaking, the unit of time will be more on the order of days, weeks, months, or even years as opposed to seconds, minutes, or hours.

A decline, over time, in anodic current 310 is shown in graph 300. Gradually, anodic current is seen decreasing from an upper limit 320, defined by a baseline anodic current, which is substantially similar/identical to the baseline corrosive current as discussed in the description of FIG. 1. The anodic current declines toward a lower limit 330, defined as a critical anodic current, which is also substantially similar/identical to the critical corrosive current as discussed in the description of FIG. 1.

In accordance with the present disclosure, the baseline anodic current and critical anodic current may be determined via a calibration process that is substantially similar/identical to the calibration process as discussed in the description of FIG. 1 and executed by ACRC engine 220. To monitor its decline, the magnitude of the anodic current 310 is measured, periodically. From those measured values a rate of reduction of the anodic current 310 is calculated. Responsive to the rate of reduction of the anodic current 310 being determined, an estimate of a remaining useful life of the water heater storage tank is made. The operations used in calculating the rate of reduction of the anodic current 310 and estimating a useful remaining life therefrom can be substantially similar/identical to those performed by RUL estimator 240.

As a non-limiting example, a water heater storage tank installed in a particular water heating system has a life expectancy of 10 years. The baseline anodic current is determined through the calibration process to be 5 mA, while the critical anodic current is found to be 1 mA through the same calibration. Furthering this example, given the intrinsic characteristics of the water stored in the water heater storage tank, an expected rate of reduction for the anodic/corrosive current flowing therein is (a relatively constant) 0.5 mA/year (e.g., the slope of the line representing the anodic current 310 is expected to be approximately (−0.5), on average). From this information, it can be predicted that eight years will pass before the anodic current falls below the lower limit 330 of the anodic current range. Responsive to the measured anodic current crossing the lower limit 330 of the anodic current range, after the passage of (approximately) eight years, an alert indicating the water heater storage tank has two years of useful life remaining will be transmitted. Further, at this time, the water heater storage tank will have entered the red zone, and recommendations based on the remaining useful life of the water heater storage tank will change from regular maintenance to complete replacement of the water heater storage tank.

Initially, as depicted in graph 300, measured respective values (e.g., magnitude) of the anodic current 310 were at or near the upper limit 320 of the anodic current range. While at or near the upper limit 320 of the anodic current range, the respective water heater storage tank is considered as being in the green zone, indicating the tank is in good health. After about eight years, the anodic current 310 is fast approaching the lower limit 330 of the anodic current range. Responsive to the anodic current 310 crossing the lower limit 330 of the anodic current range, after the passage of about 8 years, the water heater storage tank is considered to have entered the red zone, sending an alert to the owner of the water heating system is indicating that the storage tank is nearing the end of its life and strongly encouraging inspection/replacement of the tank. However, in this particular example, and assuming the water heater storage tank lasts the full 10 years as expected, the owner of the water heating system should have a sufficient amount of time (up to two years) to schedule a final inspection of the water heater storage tank, price shop for replacement water heater storage tanks and licensed professional to complete the replacement, and to schedule the replacement before a catastrophic failure of the water storage tank occurs.

Also depicted in graph 300 is a threshold value 340 (which is substantially similar/identical to the threshold value as discussed in the description of FIG. 1), established between the baseline anodic current and the critical anodic current, which can correspond to the value of the baseline anodic current, the value of the critical anodic current, or a value that is truly in between the baseline and critical anodic current values. If the threshold value 340 corresponds with the lower limit 330 of the anodic current range, the previous discussion of what happens when the anodic/corrosive current crosses into the red zone can apply directly. If the threshold value 340 corresponds to a value in between the upper limit 320 and the lower limit 330 of the anodic current range (e.g., falling at or near the middle of the anodic current range as depicted in FIG. 3), when the anodic current 310 falls below the threshold value 340, the water heater storage tank can be considered as being in the yellow zone, and the corrosion prediction circuitry can be configured to transmit an alert to the owner of the water heating system indicating that the water heater storage tank is approximately half way into its expected life and/or recommending a maintenance schedule corresponding to the estimated remaining useful life. If the threshold value 340 corresponds with the upper limit 330 of the anodic current range, another threshold can be determined automatically, until the threshold value 340 corresponds to a value that is near the middle of the anodic current range or below.

As described above and as depicted in FIG. 3, it is expected that the rate of reduction of the anodic current of a water heater storage tank in a water heating system is to be fairly constant over time. However, at anomaly 315, the rate of reduction of the anodic current 310 is substantially higher than the expected rate of reduction of 0.5 mA/year, as indicated by tangent to the line representing anodic current 310 being nearly vertical. Such a vertical anomaly, if persisting over a specified time period, can indicate a likelihood of a catastrophic failure of the water heater storage tank. In the event an anomaly persists over such a period of time, an alert indicating the same will be transmitted.

Alerts indicative of a remaining useful life of a water heater storage tank can be transmitted to computing devices and/or mobile computing devices, including but not limited to: personal computing devices, laptops, mobile phones, tablets, personal digital assistants (PDAs), or a combination thereof. Although described as a percentage, the percentage corresponding to a color, in the discussion of FIG. 3 above, it is to be understood that a remaining useful life of the water heater storage tank can be represented in a multitude of different ways. For instance, and for the sake of listing a few additional non-limiting examples, a remaining useful life could be depicted, among others, solely as a percentage, solely in color-coded fashion, on a scale from 1-10, using a different numeric scale, and/or a combination thereof.

Figure 4:
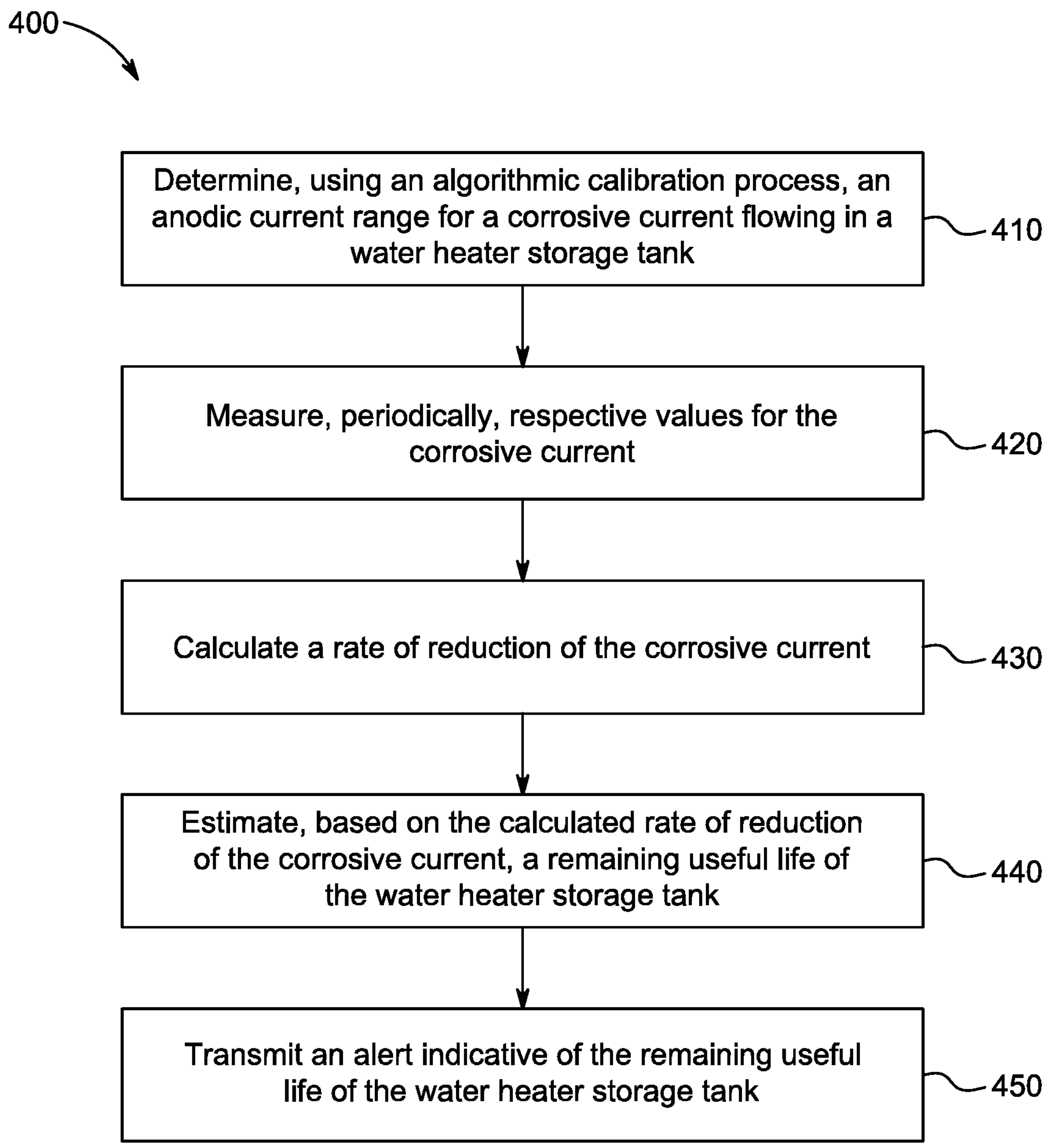
FIG. 4 presents a method of predicting a remaining useful life of a water heater storage tank, in accordance with the present disclosure.

FIG. 4 presents a method 400 of predicting a remaining useful life of a metallic water heater storage tank, in accordance with the present disclosure. The method can include determining, using an algorithmic calibration process, an anodic current range for a corrosive current flowing between the water heater storage tank and an anode rod inserted into the water heater storage tank at a step 410. The anode rod inserted into the water heater storage tank can be a sacrificial anode rod composed of magnesium, aluminum, a magnesium alloy, or an aluminum alloy.

The anodic current range can be determined via a calibration process. The calibration process can include measuring intrinsic characteristics, such as hardness, pH, salinity, alkalinity, etc., of water stored in the water heater storage tank. These intrinsic characteristics can be measured over an extended period of time (e.g., three days, seven days, two weeks, one month). Based on the values of the intrinsic characteristics of the water stored in the water heater storage tank measured over the extended period of time, a baseline corrosive current, defining an upper limit of the anodic current range, can be estimated.

As a non-limiting example, a moving average of the values corresponding to the intrinsic characteristics (e.g., hardness and/or pH) of the water stored in the water heater storage tank measured over the seven-day calibration process can be used to estimate the baseline corrosive current. Responsive to the baseline corrosive current being estimated and based on the measured intrinsic characteristics of the water stored in the water heater storage tank, a critical corrosive current defining a lower limit of the anodic current range is estimated.

The method 400 can include measuring, periodically, respective values for the corrosive current at a step 420 and calculating, at a step 430, a rate of reduction of the corrosive current based on the respective measured values for the corrosive current. At a step 440, based on the calculated rate of reduction of the corrosive current, an estimate of the remaining useful life of the water heater storage tank can be made.

An alert indicative of the remaining useful life of the water heater storage tank can be transmitted at a step 450, and the transmission of the alert can be based, at least in part, on the calculated rate of reduction of the corrosive current. Alerts indicative of a remaining useful life of a water heater storage tank, such as the ones indicating whether the water heater storage tank has entered "the yellow zone"/"the red zone"/relating to the recommended maintenance schedule of the water heater storage tank can be configured for transmission to computing devices and/or mobile computing devices, including but not limited to: personal computing devices, laptops, mobile phones, tablets, personal digital assistants (PDAs), or a combination thereof.

In accordance with the present disclosure, estimating the remaining useful life of the water heater storage tank can include establishing a threshold value between the baseline corrosive current and the critical corrosive current, below which the alert indicative of the remaining useful life of the water heater storage tank is transmitted. This threshold value can be substantially similar/identical to the threshold value 340.

The baseline corrosive current, the critical corrosive current, the threshold value(s) established between the baseline corrosive current and the critical corrosive current, and the remaining useful life of the water heater tank can be estimated using at least one of a regression analysis technique, a distributive algorithm, and/or a machine learned algorithm. Furthermore, the baseline corrosive current, the critical corrosive current, and the respective measured corrosive current(s) can be galvanic currents.

It is to be appreciated that the Detailed Description section, and not the Abstract section, is intended to be used to interpret the claims. The Abstract section may set forth one or more but not all exemplary embodiments of the present application as contemplated by the inventor(s), and thus, is not intended to limit the present application and the appended claims in any way.

The present application has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the application that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present application should not be limited by any of the above-described exemplary embodiments, but should be defined only in accordance with the following claims and their equivalents.

What is claimed is:

1. A method of predicting a remaining useful life of a water heater storage tank, the method comprising:

estimating, using an algorithmic calibration process and based on measured water hardness or pH of water stored in the water heater storage tank, an anodic current range for a corrosive current flowing between the water heater storage tank and an anode rod inserted into the water heater storage tank;

periodically measuring respective corrosive current values;

calculating a rate of reduction of the corrosive current based on respective corrosive current values;

estimating, based on the calculated rate of reduction of the corrosive current, a remaining useful life of the water heater storage tank; and transmitting an alert indicative of the remaining useful life of the water heater storage tank based, at least in part, on the calculated rate of reduction of the corrosive current.

2. The method of claim 1, wherein the calibration process used in determining the anodic current range further comprises:

receiving water data indicative of the measured water hardness or pH;

estimating, based on the water data, a baseline corrosive current, wherein the baseline corrosive current defines an upper limit of the anodic current range; and estimating, responsive to the baseline corrosive current being estimated and based on the water data, a critical corrosive current, wherein the critical corrosive current defines a lower limit of the anodic current range.

3. The method of claim 2, wherein estimating the remaining useful life of the water heater storage tank further comprises establishing a threshold value between the baseline corrosive current and the critical corrosive current, wherein corrosive current values less than the threshold value corresponds to transmission of the alert.

4. The method of claim 2, wherein estimating the baseline corrosive current, the critical corrosive current, and the remaining useful life of the water heater storage tank uses at least one of: a regression analysis technique, a distributive algorithm, and/or a machine learned algorithm.

5. The method of claim 2, wherein the baseline corrosive current, the critical corrosive current, and the respective corrosive current values each correspond to galvanic currents.

6. The method of claim 1, wherein the anode rod inserted into the water heater storage tank is a sacrificial anode rod comprising a magnesium alloy or an aluminum alloy.

7. The method of claim 1, wherein the alert indicative of the remaining useful life of the water heater storage tank is configured for transmission to at least one of a computing device, a mobile computing device, or a combination thereof.

8. A non-transitory computer-readable storage medium having a set of computer-executable instructions stored thereon, execution of which, by one or more processing devices, causes the one or more processing devices to perform operations for predicting the remaining useful life of a water heater storage tank, the operations comprising:

estimating, using an algorithmic calibration process and based on measured water hardness or pH of water stored in the water heater storage tank, an anodic current range for a corrosive current flowing between the water heater storage tank and an anode rod inserted into the water heater storage tank;

periodically measuring respective corrosive current values;

calculating a rate of reduction of the corrosive current based on the respective measured corrosive current values;

estimating, based on the calculated rate of reduction of the corrosive current, a remaining useful life of the water heater storage tank; and transmitting an alert indicative of the remaining useful life of the water heater storage tank based, at least in part, on the calculated rate of reduction of the corrosive current.

9. The computer-readable storage medium of claim 8, wherein the calibration process used in determining the anodic current range further comprises:

receiving water data indicative of the measured water hardness or pH;

estimating, based on the water data, a baseline corrosive current, wherein the baseline corrosive current defines an upper limit of the anodic current range; and estimating, responsive to the baseline corrosive current being estimated and based on the water data, a critical corrosive current, wherein the critical corrosive current defines a lower limit of the anodic current range.

10. The computer-readable storage medium of claim 9, wherein estimating the remaining useful life of the water heater storage tank further comprises establishing a threshold value between the baseline corrosive current and the critical corrosive current, wherein corrosive current values less than the threshold value corresponds to transmission of the alert.

11. The computer-readable storage medium of claim 9, wherein estimating the baseline corrosive current, the critical corrosive current, and the remaining useful life of the water heater storage tank uses at least one of a regression analysis technique, a distributive algorithm, and/or a machine learned algorithm.

12. The computer-readable storage medium of claim 9, wherein the baseline corrosive current, the critical corrosive current, and the respective corrosive current values each correspond to galvanic currents.

13. The computer-readable storage medium of claim 8, wherein the anode rod inserted into the water heater storage tank is a sacrificial anode rod comprising a magnesium alloy or an aluminum alloy.

14. The computer-readable storage medium of claim 8, wherein the alert indicative of the remaining useful life of the water heater storage tank is configured for transmission to one or more of a computing device and/or a mobile computing device.

15. A water heating system comprising:

a water heater storage tank;

an anode rod inserted into the water heater storage tank; and corrosion prediction circuitry in electrical communication with the water heater storage tank and the anode rod, wherein the corrosion prediction circuitry is configured to:

estimate, algorithmically and based on measured water hardness or pH of water stored in the water heater storage tank, an anodic current range for a corrosive current flowing between the water heater storage tank and the anode rod;

periodically measure respective values of the corrosive current;

calculate a rate of reduction of the corrosive current based on the respective corrosive current values;

estimate, based on the calculated rate of reduction of the corrosive current, a remaining useful life of the water heater storage tank; and transmit an alert indicative of the remaining useful life of the water heater storage tank based, at least in part, on the calculated rate of reduction of the corrosive current.

16. The water heating system of claim 15, wherein the corrosion prediction circuitry is further configured to determine the anodic current range via a calibration process, the calibration process comprising:

measuring the water hardness or pH;

estimating, based on the measured water hardness or pH, a baseline corrosive current, wherein the baseline corrosive current defines an upper limit of the anodic current range; and estimating, responsive to the baseline corrosive current being estimated and based on the measured water hardness or pH, a critical corrosive current, wherein the critical corrosive current defines a lower limit of the anodic current range.

17. The water heating system of claim 16, wherein the corrosion prediction circuitry is further configured to estimate a threshold value between the baseline corrosive current and the critical corrosive current, wherein corrosive current values less than the threshold value corresponds to transmission of the alert.

18. The water heating system of claim 16, wherein the baseline corrosive current, the critical corrosive current, and the remaining useful life of the water heater storage tank uses at least one of a regression analysis technique, a distributive algorithm, and/or a machine learned algorithm.

19. The water heating system of claim 15, wherein the alert indicative of the remaining useful life of the water heater storage tank is configured for transmission to one or more of a computing device and/or a mobile computing device.

20. The water heating system of claim 15, wherein the anode rod is a sacrificial anode rod comprising a magnesium alloy or an aluminum alloy.

* * * * *